Figure 1:
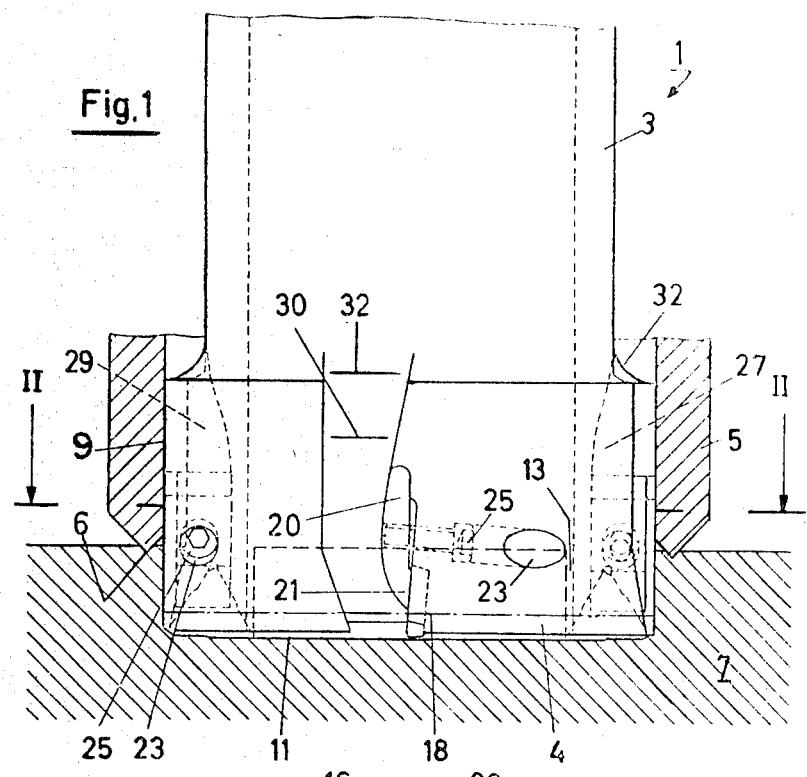

United States Patent

[11] 3,591,306

[72] Inventor Alfred Kaser
 Rieden, Nussbaumen, Switzerland
[21] Appl. No. 788,445
[22] Filed Jan. 2, 1969
[45] Patented July 6, 1971
[73] Assignee Aktiengesellschaft Brown, Boveri & Cie.
 Baden, Switzerland
[32] Priority Jan. 12, 1968
[33] Switzerland
[31] 525/68

[54] CORE BORER
 2 Claims, 6 Drawing Figs.
[52] U.S. Cl. .................................................. 408/204,
 408/59
[51] Int. Cl. .................................................. B23b 51/04
[50] Field of Search .......................................... 77/68, 69

[56] References Cited
 UNITED STATES PATENTS
 3,244,035  4/1966  Jehle et al. ..................... 77/69
 3,203,493  8/1965  Bergstrom ..................... 175/383
 2,182,263  12/1939  Probert .......................... 408/59
 687,724  12/1901  Cadell ............................ 77/69
 313,405  3/1885  Davis .............................. 77/69 X
 FOREIGN PATENTS
 1,506,101  11/1967  France ........................... 77/68

Primary Examiner—Francis S. Husar
Attorney—Pierce, Scheffler & Parker

ABSTRACT: A core drill structure comprises a hollow shaft to which an annular drill head is secured, the drill head including a plurality of equispaced recesses for receiving plates provided with alternatively usable cutting edges for drilling an annular hole. The cutting edges of the plates are respectively staggered in a radial direction so that each cutting edge works only a portion of the width of the annular cut, and these cutting edges are also disposed respectively in different planes normal to the drill axis in order to also establish an axial staggering of the cutting edges of adjacent plates.

Inventor
Alfred Käser

Inventor
Alfred Käser

CORE BORER

This invention relates to an improvement in a core borer or drill, consisting of a shaft and a drilling head in whose recesses which are equispaced over the circumference there are fastened, in planes approximately radial to the drilling axis, at least two plates of hard metal or the like which carry multiple cutting edges, whereby the in-use cutting edge of each plate is staggered in radial direction with respect to the next plate, working only a part of the ring width.

The known core drills have the disadvantage that the volume to be machined by chip removal is considerably, due to the geometry of the cutting edges and the space required for holding the cutting tools, so that very great driving outputs become necessary, and that, if used in radial drills, boring mills or similar machine tools, various preparatory operations such as the welding on and machining of pilot pins or the turning of pilot grooves in precisely predetermined locations must be carried out with great loss of time for each individual drilling operation for the purpose of supporting the main cutting force (revolving radial force). In addition, the very great revolving radial force caused by the geometry of the cutting edges brings about the following negative effects:

There develop very great frictional losses between the drilling head and the walls of the drilling hole, necessitating among other factors much driving power.

The guiding devices described above are not in a position to support the revolving radial forces completely so that vibrations develop in starting the drilling operation, resulting in short tool life between grinds. The costs involved in keeping the core drill up, meaning the costs per regrind, are very high.

The consequence thereof is that core drills, except for their use in deep hole-drilling equipment, have so far been employed only rarely.

It is the purpose of the present invention to eliminate these disadvantages. To this end the core-drilling equipment according to the invention is characterized in that the cutting edge of each plate lies in a plane normal to the drilling axis, whereby those normal planes which are associated with two plates following each other in circumferential direction are staggered against each other in axial direction.

Figure 2:
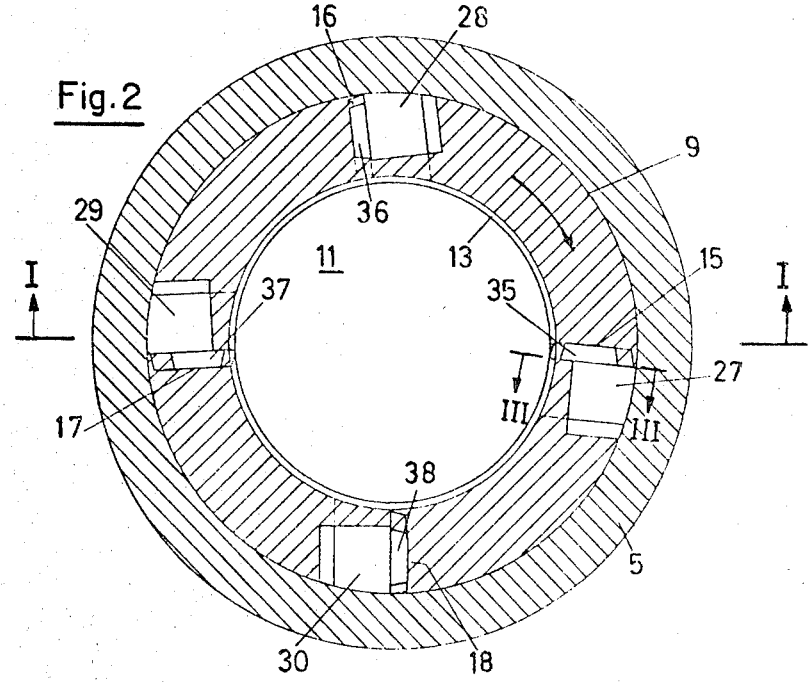
Figure 3:
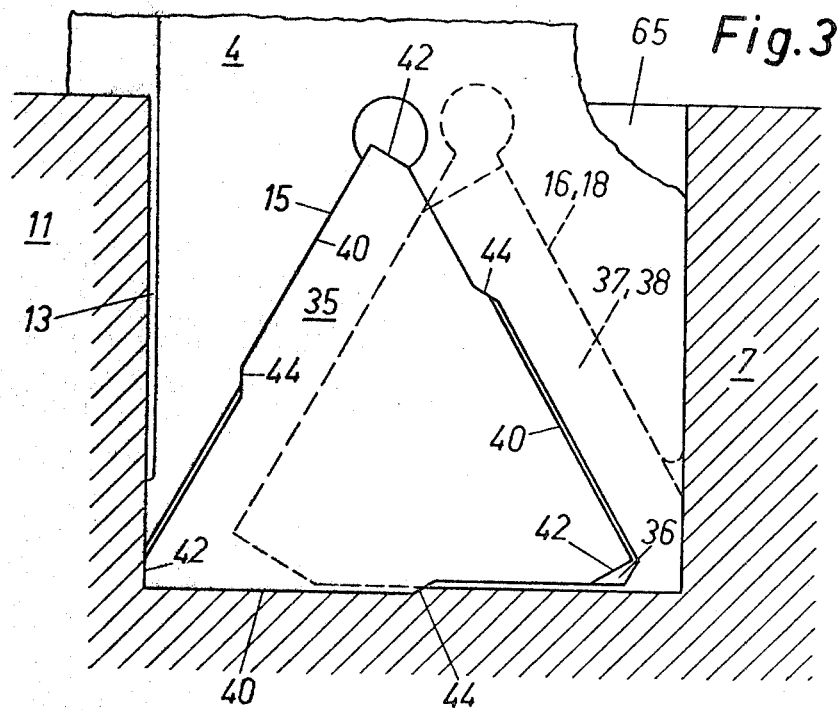
Figure 4:
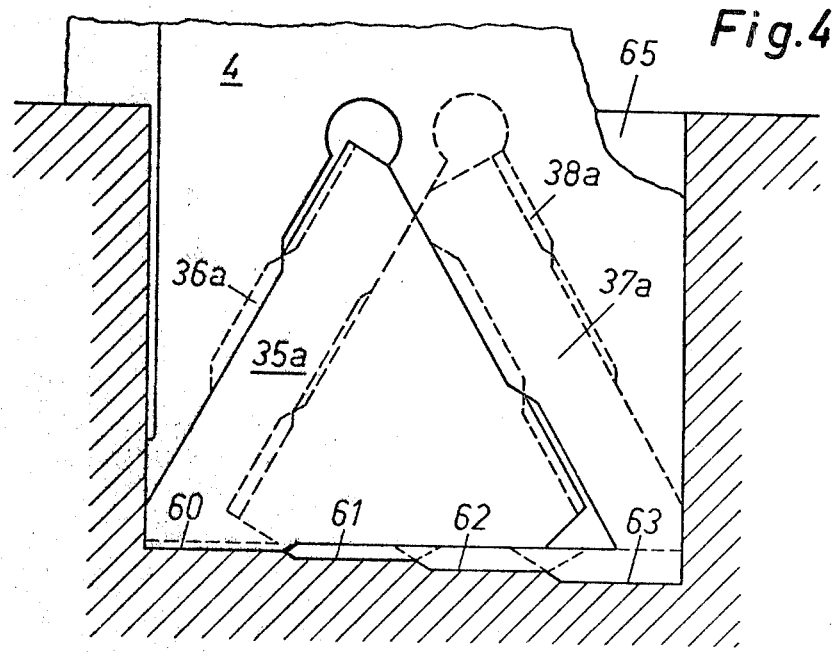
Figure 5:
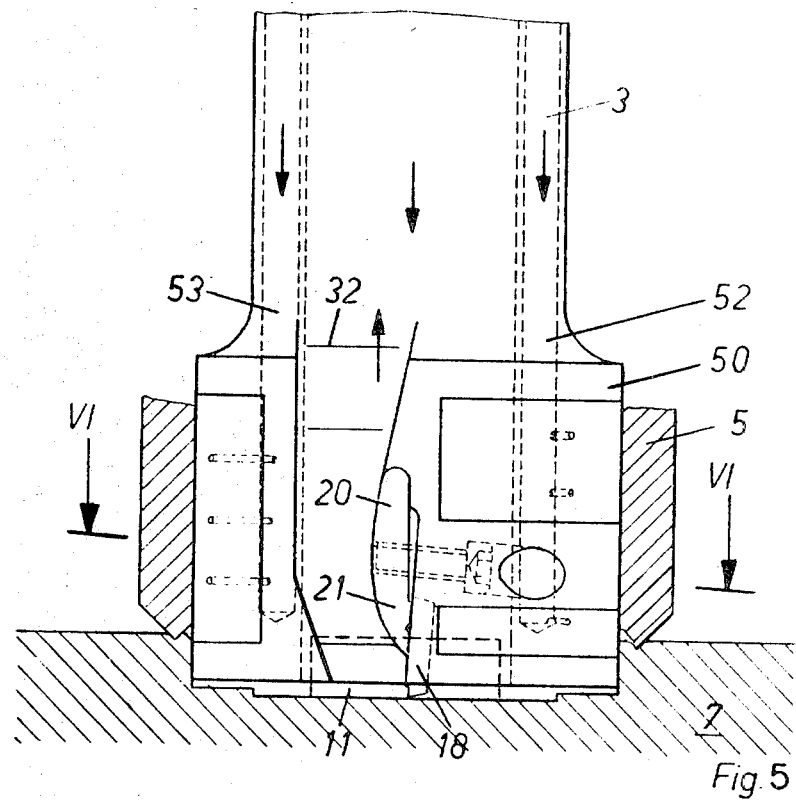
Figure 6:
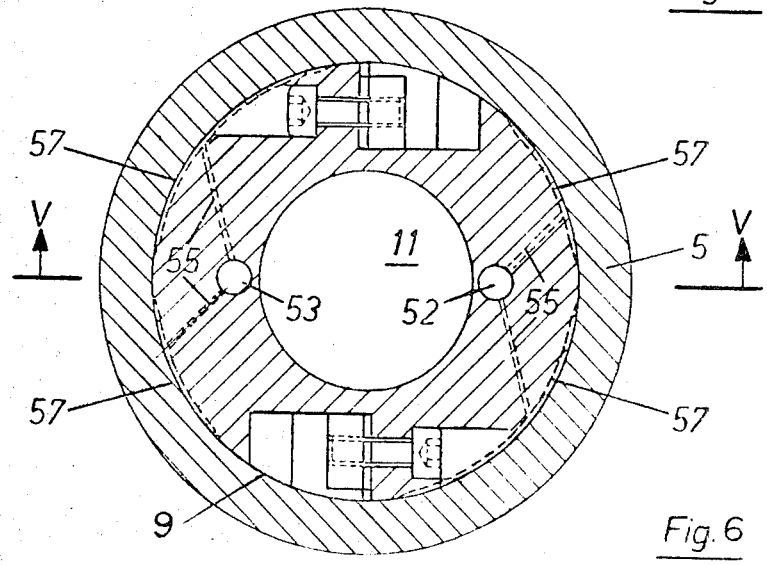

The invention is explained by the following embodiment which is illustrated by way of the accompanying drawings wherein:

FIG. 1 shows an arrangement of a core drill in the process of being used, sectioned along line I-I of FIG. 2, FIG. 2 is a cross section along line II-II of the arrangement according to FIG. 1, FIG. 3 is an enlarged view of a section along line III-III of FIG. 2, FIG. 4 shows another design possibility pertaining to FIG. 3, and FIGS. 5 and 6 show an arrangement analogous to that of FIGS. 1 and 2 in modified design.

With reference now to the drawings, and to FIG. 1 in particular, the core drill 1, of which the hollow drilling shaft 3 with the drilling head 4 is tightly enclosed by an axially movable drill bushing 5 which is so held and whose front end is so designed that, depending on the size of the core drill, the upper surface of the workpiece 7 can be deformed in the elastic or plastic region by wedge-shaped drill bushing faces 6, or that a groove can be cut or milled in the workpiece 7 by the rotating drill bushing 5 which is subsequently pushed with great force into this groove. Because of this the drill bushing 5 is immovably anchored in the workpiece 7.

The core drill has already bored an annular drill hold out of the workpiece 7 (65 in FIG. 3). The core 11, which is unattached after the hole is drilled through and which is removed from the shaft 3, rises with increasing depth to the hollow drill shaft 3. Between the inner jacket of the hollow drill shaft 3 and the outer contour of the core there forms, according to the attitude of the chip-removing tools, an annular oil supply channel 13 whose width is in the order of or greater than 1 mm. In accordance with the number of tools to be employed, there are provided in the drilling head 4 four recesses 15, 16, 17 and 18 for cutter plates 35, 36, 37 and 38, preferably made of hard metal. By means of the clamp holder 20 whose holding nose 21 rests on the plate, each plate is pressed against the opposite wall of the recess. This is done by means of the socket head capscrew 25 which is applied through the opening 23 disposed tangentially in the drilling head 4 and which can be screwed into the clamp holder 20. The insertion of the clamp holders 20 is accomplished from four oil drainage channels 27, 28, 29 and 30 which are approximately symmetrical and equispaced over the circumference of the drilling head 4. These oil drainage channels 27—30 extend from the face of the drilling head 4 to its upper end where they terminate in openings 32, as may be seen from FIGS. 1 and 2.

FIG. 3 represents a sector of FIG. 2, from which the position of the plate 35 during the drilling operation may be seen. This plate 35, like all the others, is of essentially triangular, symmetrical, flat shape so that it can be repositioned by turning it by 120° after its first cutting edge is worn and its second, unused cutting edge can be used, an operation repeated when that cutting edge is worn also, before new plates have to be put in. Each triangular plate is equipped with three cutting edges 40, one along each side, for machining the bottom of the hold, as well as with three guide surfaces 42. The cutting edge in working position is disposed in a plane normal to the drilling axis. The cutting edge 40 does not extend over the entire length of the correlated base of the triangle, but is offset by a shoulder 44 approximately in the center, or slightly beyond the center, to form a part not usable as cutting edge. Since the core drill has at least two cutting plates and the plates are normally equispaced over the circumference of the drilling head 4, the one plate 35 is always used for the machining of the one part of the drill hole bottom by means of cutting edge 40, whereas the second plate, shown in dotted lines in FIG. 3, represents one of the plates 36 or 38 turned into the plane of the drawing. In the preferably spark-eroded recesses 16 or 18 of the drilling head 4, the plates 36 and 38 are radially staggered with respect to the plates 35 and 37 so that their cutting edges 40 machine the remaining portion of the bottom surface of the drill hole. Through this arrangement it is possible, even with but two plates, to largely equalize the radial forces, thereby preventing the development of friction and vibrations because the turning moments are very small, due to the geometry of the cutting edges of the plates. Instead of using a sintered carbide as the hard metal, a preferred implementation form, the plates may also be made of high-speed steel. Inserting the plates directly into the drilling head had been deemed impossible by experts in this field for reasons of production methods and accuracy. The spark erosion method shows the way to the solution.

To produce a through-hole by means of a core drill, the empty drilling head 4 is connected to the drive spindle. Then the drill bushing 5 is pushed over the drilling head 4, whereupon the plates are inserted and fastened in the drilling head. This procedure prevents injury to the plates when the drilling head is run into the drill bushing with plates mounted. The drill bushing 5 is then pressed with great force and, depending on the core drill diameter, with rotary motion against the workpiece 7 so that, after lifting it off, the coring edge 6 leaves a well noticeable track or groove. Then the core drill 1, whose shaft 3 is retained in the not illustrated drill chuck, is lowered in such fashion that the drilling head 4, equipped with the guide surfaces 9, runs into the drill bushing 5 and its circumference is guided by the latter. As may be seen from the drawings, the respective four plates 35—38 are inserted in the correlated recesses 15—18 in the drilling head 4, and fastened by means of the clamp holders 20 and the screws 25. When four plates are used, two diametrically opposed ones, 35 and 37, are employed to machine out the core 11, and the two others, 36 and 38, serve to machine the drill hole wall. Due to the virtually symmetrical arrangement it is achieved that only very small turning moments and, hence, the least vibrations occur, because the radial forces virtually cancel each other out on account of the symmetry. In addition, the drill bushing 5, of course, also prevents the development of such vibrations, since it keeps the entire system extremely rigid in the area of the drilling head whose guide surfaces 9 later guide it automatically in the workpiece The supply of oil under pressure through the hollow drill shaft 3 starts with the start of the drilling operation, being pressed into the annular channel 13 at a pressure of, for example, from 70 to 200 atmospheres absolute, from which it flows over the drill bottom of the workpiece 7, flowing in front of the cutting edges 40 of the plates 35—38 and leaving the drilling head 4 through the oil drainage channels 27—30 with their openings 32. This oil thereby not only lubricates the walls of the drill hole 65 and the corresponding surface of the drilling head 4, but it also generates between the inner surface of the drill bushing 5 ad the drilling head 4 a pressure oil reservoir which may also communicate directly with the annular channel 13. The main function of this oil supply, however, lies in the floating away of the drilling chips and in the simultaneous cooling of the plates 35—38.

The removed chips, pushed ahead of the cutting edges 40 of the plates 35—38 are carried away by the pressure oil arriving at great velocity and discharged through the oil drainage channels 27—30. The oil throughput in such a core drilling operation of, for example, 50 cm. diameter lies in the order of 150 liter/min, whereby the drill is driven at circumferential speeds of, for example, between 70 and 100 m/min. In order to conduct the mixture of oil and chips out of the channels 27—30, a chip and oil-deflecting element is provided over their openings 32.

Shown in FIG. 4 is, analogous to the structure depicted in FIG. 3, a special model for machine tools with low drive output, with a drilling head with four plates 35a—38a and the fourfold stepped edges 60—63 of the cutting planes. The result of this is that the cutting edge of each plate now machines only one-fourth of the width of the annular drill hole 65. The consequence of this is that a correspondingly lower drive output can be worked with. Or, especially when the drilling head diameter is large, two or more groups of cutting edges, belonging together and covering a full width of the drill hole, may be provided so that the feed rate may logically be doubled or even further increased, which naturally necessitates an increase in drive output to the same extent.

Generally speaking, the shape of the plate must be such that it can be introduced into the drilling head effortlessly and restained in it in the manner of a wedge. A form-closing connection is thus created between the drilling head and the plate.

The plates machining the walls of the drilled hole are radially staggered with respect to each other very slightly, for example, by several tenths up to 3 mm., in order to preserve, as explained earlier, the best possible symmetry in view of friction losses and vibrations to be avoided, and in order to achieve high feed rates in consequence thereof.

FIGS. 5 and 6 show another design corresponding to FIGS. 1 and 2. However, three different pressure oil supply channels are provided in the drilling head 50: The central channel for the actual chip removal oil, such as under 70 atmospheres absolute, analogous to the design according to FIGS. 1 and 2, and, additionally, two eccentric vertical channels 52 and 53 conducting lubricating oil under a pressure of, for example, 200 atmospheres absolute. This oil is led from channels 52, 53 through horizontal distributor channels 55 to the pockets 57 in the drilling head 50. This results in a hydrostatic lubrication of the drilling head 50 located in the drill bushing 5, even at standstill and at slow speeds. With increasing speed, the pockets 57 effect a hydrodynamic lubrication of the drilling head located in the drill bushing, thereby favoring accurate guidance of the core drill and reliably preventing the occurrence of vibrations (chattering of the boring tool).

As regards the coring edge, called milling edge 6 when the drill bushing 5 is pressed under rotation against the workpiece it becomes a milling edge by virtue of the circular coring edge, closed in itself, being divided by one, preferably several, recesses extending radially, for example. This makes the newly created front edges of the coring edge act as cutting edges, whereas, due to the deformation of the workpiece in the region of edge 6, the material escapes into these recesses and is removed, at least in part, by the next cutting edge.

After positioning and pressing the drill bushing against the workpiece under high pressure (such as an area pressure of 4500 kg./cm.$^2$), a force-closing and form-closing connection between the workpiece and the machine tool is basically established via the drill bushing.

It should further be kept in mind that the arrangement described allows the width of the annular channel to be made only between approximately 15 and 20 mm., even where large hole diameters of, for example, 500 mm. are involved.

The described design of a core-drilling machine makes it possible to make the annular drill hole 65 between the outside wall of the drill hole and the outside diameter of the core smaller by 50 percent, as compared to a conventional core drill, resulting in a corresponding reduction in drive output. It is accomplished by the geometry of the cutting edges and by the arrangement of several cutting edges distributed over the circumference of the drilling head that the revolving radial force is nearly zero, which brings with it a further reduction in drive output by 25 percent. In total, therefore, assuming that the drill hole diameter is the same, the core-drilling equipment according to the invention makes it possible to reduce the drive output by approximately 75 percent compared to a conventional core-drilling machine, or to increase the rate of feed and the work output fourfold.

I claim:

1. In a core drill the combination comprising a hollow shaft, an annular drill head secured to the lower end of said drill shaft, means providing a plurality of circumferentially and equally spaced recesses in the body of said drill head extending to the bottom thereof, and a cutter plate individual to and secured in each said recess in a plane substantially radial to the drill axis, each said cutter plate being provided with alternatively usable hard cutting edges along different sides thereof, the cutting edge extending for only a portion of the appertaining side and being offset from the remaining noncutting portion so as to project in an axial direction beyond the cutter edge, the in-use cutting edge of each said plate being staggered in a radial direction in relation to the in-use cutting edge of an adjacent plate such that the cutting edge of each said plate machines only a portion of the width of the annular hole which is drilled, and the in-use cutting edges of adjacent plates being disposed respectively in different planes which are normal to the drill axis such as to establish an axial staggering of the cutting edges of adjacent plates.

2. A core drill as defined in claim 1 and wherein said cutter plates are provided with lateral guiding surfaces which are slidable along the wall of the annular drilled hole.